(12) United States Patent
Baisley et al.

(10) Patent No.: US 6,408,311 B1
(45) Date of Patent: Jun. 18, 2002

(54) METHOD FOR IDENTIFYING UML OBJECTS IN A REPOSITORY WITH OBJECTS IN XML CONTENT

(75) Inventors: Donald Edward Baisley, Laguna Hills; C. Suresh Kumar, Mission Viejo, both of CA (US)

(73) Assignee: Unisys Corp., Blue Bell, PA (US)

( * ) Notice: Subject to any disclaimer, the term of this patent is extended or adjusted under 35 U.S.C. 154(b) by 0 days.

(21) Appl. No.: 09/345,290

(22) Filed: Jun. 30, 1999

(51) Int. Cl.[7] .............................................. G06F 17/30
(52) U.S. Cl. ..................... 707/203; 707/513; 703/25; 717/1
(58) Field of Search ..................... 707/1, 203, 103, 707/522, 513; 717/1, 3; 395/705; 703/25

(56) References Cited

U.S. PATENT DOCUMENTS

| | | | | |
|---|---|---|---|---|
| 5,978,586 A | * | 11/1999 | Baisley et al. ............... | 395/705 |
| 6,016,574 A | * | 1/2000 | Chen .............................. | 717/5 |
| 6,128,772 A | * | 10/2000 | Baisley .......................... | 717/3 |
| 6,167,564 A | * | 12/2000 | Fontana et al. ................ | 717/1 |
| 6,170,081 B1 | * | 1/2001 | Fontana et al. ................ | 717/1 |
| 6,199,082 B1 | * | 3/2001 | Ferrel et al. ................... | 707/522 |
| 6,199,195 B1 | * | 3/2001 | Goodwin et al. .............. | 717/1 |
| 6,253,366 B1 | * | 6/2001 | Mutschler, III ................ | 717/1 |
| 6,275,787 B1 | * | 8/2001 | Baisley .......................... | 703/21 |
| 6,289,501 B1 | * | 9/2001 | Mutschler, III ................ | 717/1 |
| 6,292,932 B1 | * | 9/2001 | Baisley et al. ................. | 717/1 |
| 6,330,569 B1 | * | 11/2001 | Baisley et al. ............. | 707/203 |
| 6,343,265 B1 | * | 1/2002 | Glebov et al. ................ | 703/25 |

* cited by examiner

*Primary Examiner*—Charles L. Rones
(74) *Attorney, Agent, or Firm*—Alfred W. Kozak; Mark T. Starr; Lise A. Rode

(57) ABSTRACT

In a computer system executing a repository program and having a memory, a method is disclosed for identifying UML objects in the repository with objects in an XML file. The method includes the steps of parsing the XML file into XML objects and building an object tree. Next, the object tree is traversed a first time, and for each XML object found that has a name, corresponding UML objects are identified. After this, the object tree is traversed a second time, and for each XML object found that does not have a name, corresponding UML objects are then identified through Compositions and References. The method for traversing said object tree a first time includes the steps of identifying a UML object type for each XML object, and when the XML object name matches the UML object name at the current level, a UML and XML object IDs are saved in a 'Conversion' object in the memory.

28 Claims, 16 Drawing Sheets

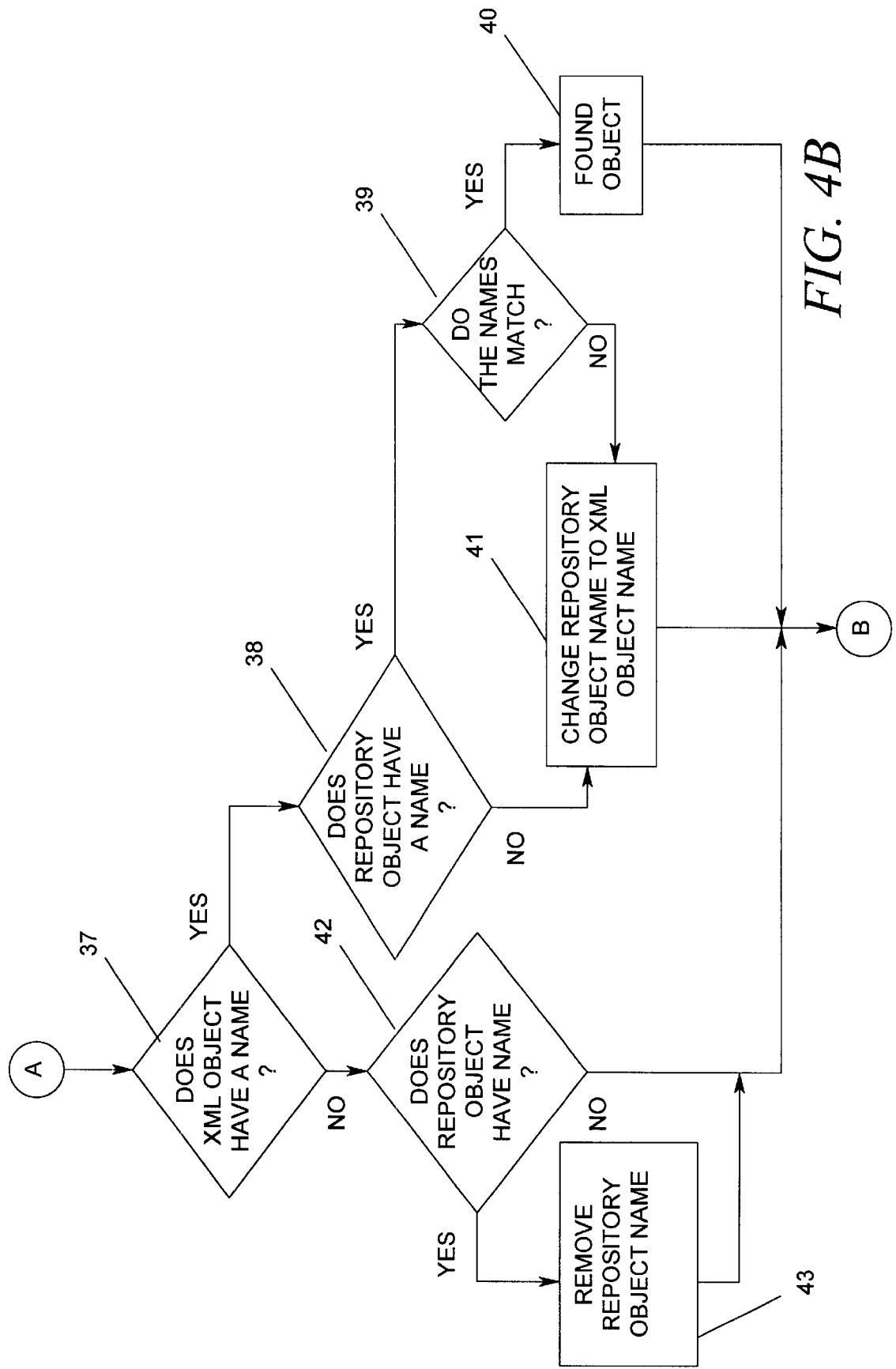

METHOD FOR IDENTIFYING UML OBJECTS IN A REPOSITORY WITH OBJECTS IN XML CONTENT

CROSS REFERENCE TO RELATED APPLICATIONS

This patent document relates to the following patent applications, assigned to the same assignee whereof, which are incorporated herein by reference.

U.S. Pat. No. 6,289,501, issued on Sep. 11, 2001, entitled A METHOD AND SYSTEM FOR GENERATING A SIMPLE DOCUMENT TYPE DEFINITION FOR DATA INTERCHANGE AMONG SOFTWARE TOOLS;

U.S. Pat. No. 6,253,366, issued Jun. 26, 2001, entitled A METHOD AND SYSTEM FOR GENERATING A COMPACT DOCUMENT TYPE DEFINITION FOR DATA INTERCHANGE AMONG SOFTWARE TOOLS;

U.S. Ser. No. 09/282,230, currently pending filed Mar. 21, 1999, entitled A METHOD AND SYSTEM FOR GENERATING A HIERARCHIAL DOCUMENT TYPE DEFINITION FOR DATA INTERCHANGE AMONG SOFTWARE TOOLS;

U.S. Pat. No. 6,292,932, issued on Sep. 18, 2001, entitled A SYSTEM AND METHOD FOR CONVERTING FROM ONE MODELING LANGUAGE TO ANOTHER;

U.S. Ser. No. 09/345,289, filed on Jun. 30, 1999, entitled A META DATA DRIVEN SYSTEM AND METHOD FOR EFFECTING DATA INTERCHANGE AMONG SOFTWARE TOOLS IN A DISTRIBUTED ENVIRONMENT; and, U.S. Pat. No. 6,330,569, issued on Dec. 11, 2001, entitled A METHOD FOR VERSIONING A UML MODEL IN A REPOSITORY IN ACCORDANCE WITH AN UPDATED XML REPRESENTATION OF THE UML MODEL.

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention generally relates to the field of object-oriented programming; and, in particular to a method and system for identifying UML objects in a repository with objects in XML content.

BACKGROUND OF THE INVENTION

XML, the Extensible Markup Language, is a new format designed to bring structured information to the Web. It is a Web-based language for electronic data interchange. XML is an open technology standard of the World Wide Web Consortium (W3C), which is the standards group responsible for maintaining and advancing HTML and other Web-related standards.

XML is a sub-set of SGML that maintains the important architectural aspects of contextual separation while removing nonessential features. The XML document format embeds the content within tags that express the structure. XML also provides the ability to express rules for the structure (i.e., grammar) of a document. These two features allow automatic separation of data and metadata, and allow generic tools to validate an XML document against its grammar.

While XML is still in its infancy, there are many well-documented applications of XML. Example application domains include Web commerce, publishing, repositories, modeling, databases and data warehouses, services, financial, health care, semiconductors, inventory access, and more.

Repositories provide a central place for recording metadata and enable one to store, manage, share and reuse information about data (i.e., metadata) that an enterprise uses. A repository can store definitional, management and operational information. Tools can be integrated with the repository to support information sharing and metadata reuse, and tool and technology models may be developed to manipulate the tool information in the repository. However, the transferring of data within models from tool to tool or from a tool to the repository has been a cumbersome and unyielding task for a long time.

It is a tedious and time-consuming task to generate a format description for enabling the interchange of metadata among repositories and each different type of modeling tool available. Accordingly, there is a need for automatically generating format descriptions to expedite interchange of metadata among repositories and modeling tools. As will be described hereinbelow, this invention solves this problem by automating the production of an XML DTD for meta-models stored in a MOF-compliant repository by implementing instances of the meta-models expressible in a meta object framework. In the past, entire models would have to be replicated to accommodate minor changes.

SUMMARY OF THE INVENTION

It is an object of the present invention to provide a method for identifying UML objects in a repository with objects in XML content.

Another object of the present invention is to provide a method and system that allows modelers the ability to identify differences between object models represented in different forms.

Yet another object of the present invention is to provide a method and system that allows a user to track changes to repository objects made by an external UML editing tool.

An advantage of the present invention is the software language independence of the algorithm used to implement the method, making it flexible and portable.

Another advantage of the present invention is the process effectively allows programs to change existing models.

These and other objects, which will become apparent as the invention is described in detail below, are provided by a computer system executing a repository program, wherein a method is disclosed for identifying UML objects in the repository with objects in an XML file. The method includes the steps of parsing the XML file into XML objects and building an object tree. Next, the object tree is traversed a first time, and for each XML object found that has a name, corresponding UML objects are identified. After this, the object tree is traversed a second time, and for each XML object found that does not have a name, corresponding UML objects are then identified through Compositions and References. The method for traversing said object tree a first time includes the steps of identifying a UML object type for each XML object, and when the XML object name matches the UML object name at the current level, a UML and XML object IDs are saved in a 'Conversion' object in the memory.

Still other objects, features and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive, and what is intended to be protected by Letters Patent is set forth in the appended claims. The present invention will become apparent when taken in conjunction with the following description and attached drawings, wherein like characters indicate like parts, and which drawings form a part of this application.

BRIEF DESCRIPTION OF THE DRAWINGS

FIGS. 4A through 4C combined form a flow chart of the overall process of the present invention.

DETAILED DESCRIPTION OF ONE EMBODIMENT

Before proceeding with a description of the system and method of the present invention, a summary of Terminology used herein is provided, which may be helpful in understanding the disclosed embodiment.

An object is an abstract representation of a real-world concept or thing. For example, an object can be used to represent a customer account in a banking application. An object has features, which can be either an operation or a property. An operation defines an action that an object can perform, or an action that can be performed on the object. For example, "make withdrawal" could be defined as an operation on a customer account object. Properties indicate the state of an object. Every property of an object has a value, and it is the property values that define the state of the object. A property can be either an attribute or a reference. An attribute defines a value that is stored within the object. For example, "current account balance" could be an attribute of the customer account object. The numeric value for the customer's account balance would be stored in the customer account object. A reference is a link or pointer to another object, and implies a relationship to that other object. A reference is typically used when it is desired not to duplicate data. For example, the customer account object could store the customer's name and address as attributes. However, if the customer opened multiple accounts, the customer's name and address would appear in multiple account objects. Therefore, it is desirable to define a separate customer object and place the name and address as attributes of the customer object. The customer account object would then contain a reference to the customer object.

A normal object program stores objects in a computer system's memory. When the program terminates, the memory used by those objects is freed and reused by other programs, making the objects that the program stored transient. An object database stores objects in a non-volatile memory, such as a computer disk. Since the information on a computer disk remains in existence, even when the computer is turned off, an object database provides the ability to persistently store objects. An object program that uses an object database thus has the option of storing objects transiently or persistently.

Figure 1:
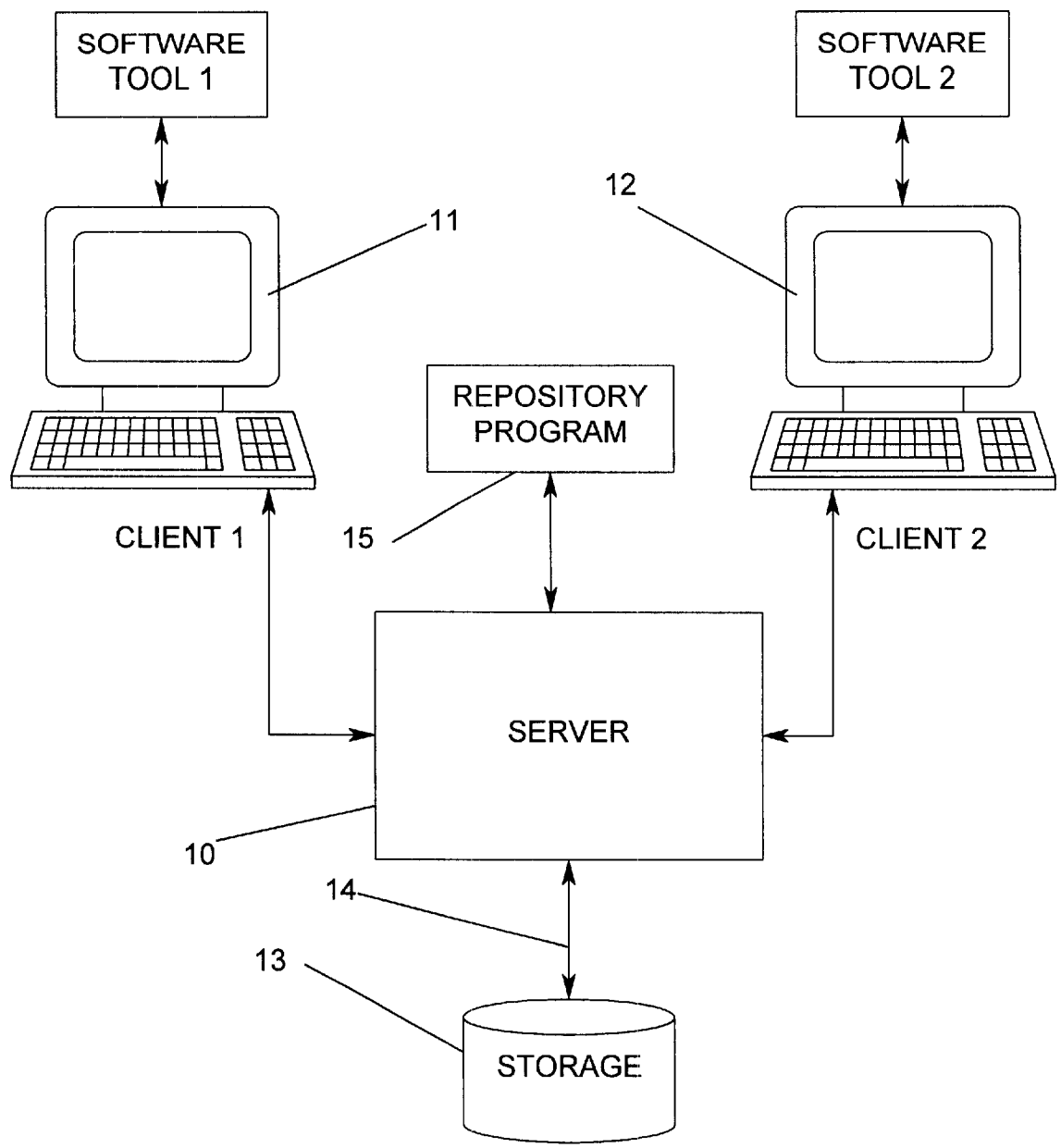
FIG. 1 is a block diagram of a system that may employ the method and system of the present invention.

Referring now to the drawings and FIG. 1 in particular, a block diagram of a system that may execute the method of the present invention is shown. A server computing system 10 is illustrated with a workstation 11 (such as Client 1) and a workstation 12 (such as Client 2) coupled being coupled to the server. It is pointed out that many more workstations may also be coupled to the server 10, and a variety of different networks may be used to for this coupling. The server 10 may also include a storage 13 coupled in a conventional manner by means of cabling 14. The storage 13 may be used for storing data useful to the programs being run in the workstations and the server itself. The workstation 11 may be executing a software modeling tool 1, while the workstation 12 may be executing another software modeling tool 2. Moreover, the server 10 is capable of executing a repository software program 15.

The repository program 15 includes tools for cataloging, browsing, and managing components that make up an application. Methods to support these services are disclosed in several patents and patent applications assigned to the assignee of this application, including U.S. Pat. No. 5,671, 398 for METHOD FOR COLLAPSING A VERSION TREE WHICH DEPICTS A HISTORY OF SYSTEM DATA AND PROCESSES FOR AN ENTERPRISE; U.S. Pat. No. 5,644, 764 for METHOD FOR SUPPORTING OBJECT MODELING IN A REPOSITORY; U.S. Pat. No. 5,581,755 for METHOD FOR MAINTAINING A HISTORY OF SYSTEM DATA AND PROCESSES FOR AN ENTERPRISE; U.S. Pat. No. 5,557,793 for IN AN OBJECT ORIENTED REPOSITORY, A METHOD FOR TREATING A GROUP OF OBJECTS AS A SINGLE OBJECT DURING EXECUTION OF AN OPERATION; pending application Ser. No. 08/623,490, filed on Mar. 28, 1996, for A METHOD FOR MAPPING TYPES IN A MODEL IN A OBJECT-ORIENTED REPOSITORY TO LANGUAGE CONSTRUCTS FOR A C BINDING FOR THE REPOSITORY;

U.S. Pat. No. 5,721,925, for METHOD FOR GENERICALLY INVOKING OPERATIONS IN AN OBJECT ORIENTED REPOSITORY; U.S. Pat. No. 6,366,251, issued on Apr. 24, 2000, for A METHOD FOR GENERATING OLE AUTOMATION AND IDL INTERFACES FROM METADATA INFORMATION; U.S. Pat. No. 5,765,039 for A METHOD FOR PROVIDING OBJECT DATABASE INDEPENDENCE IN A PROGRAM WRITTEN USING THE C++ PROGRAMMING LANGUAGE; U.S. Pat. No. 5,758,348, for A METHOD FOR GENERICALLY MANIPULATING PROPERTIES OF OBJECTS IN AN OBJECT ORIENTED REPOSITORY; U.S. Pat. No. 5,701,472, for A METHOD FOR LOCATING A VERSIONED OBJECT WITHIN A VERSION TREE DEPICTING A HISTORY OF SYSTEM DATA AND PROCESSES FOR AN ENTERPRISE; U.S. Pat. No. 6,105,073, issued on Aug. 15, 2000, for A METHOD FOR PACKING/UNPACKING C OPERATIONS TO/FROM RPC COMPATIBLE FORMAT USING THE RPC PROTOCOL TO OPERATE REMOTELY WITH AN OBJECT-ORIENTED REPOSITORY, each of which are hereby incorporated by reference as if set forth in full herein.

Figure 2:
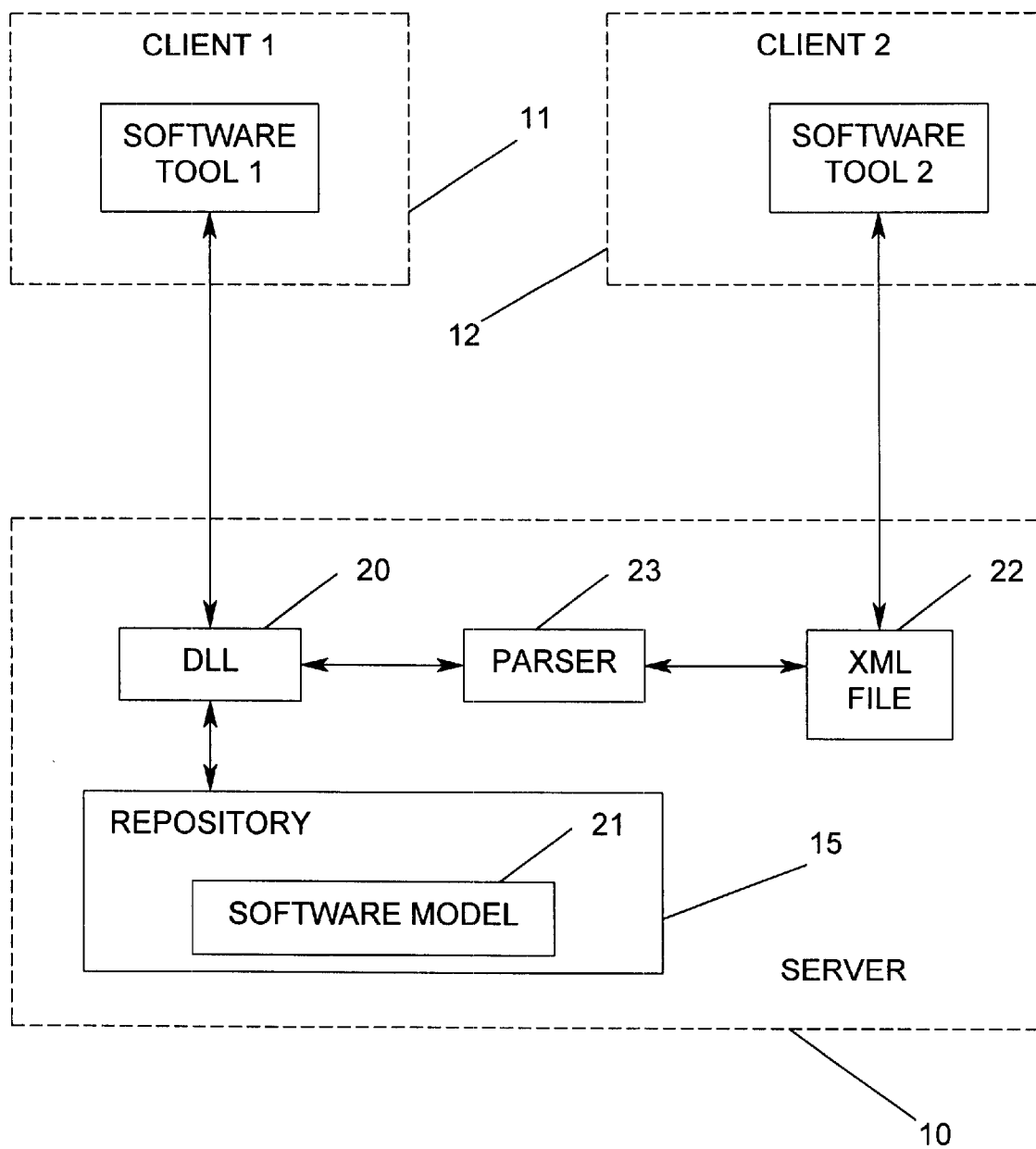
FIG. 2 is a software module block diagram of one embodiment of the method and system of the present invention.

Referring now to FIG. 2, a block diagram illustrates various software modules being executed by the server 10 and the software tools 1 and 2 being executed by the workstations 11 and 12, respectively. In the disclosed embodiment the software tool 1 running in the Client 1 interfaces directly with a dll program 20, which is a software program used for loading UML models into the repository from an XML file. The dll program 20 interfaces directly with the repository 15, which has stored therein an exemplary software model 21. The software 2 running in the Client 2 interfaces directly with an XML file 22 residing on the server 10. A parser 23 is disposed between the dll program 20 and the XML file 22 for parsing the data stream being received from the Client 2 and transmitted back to the Client 2. The parser 23 is a collection of objects, which is a result of parsing the data stream.

Figure 3:
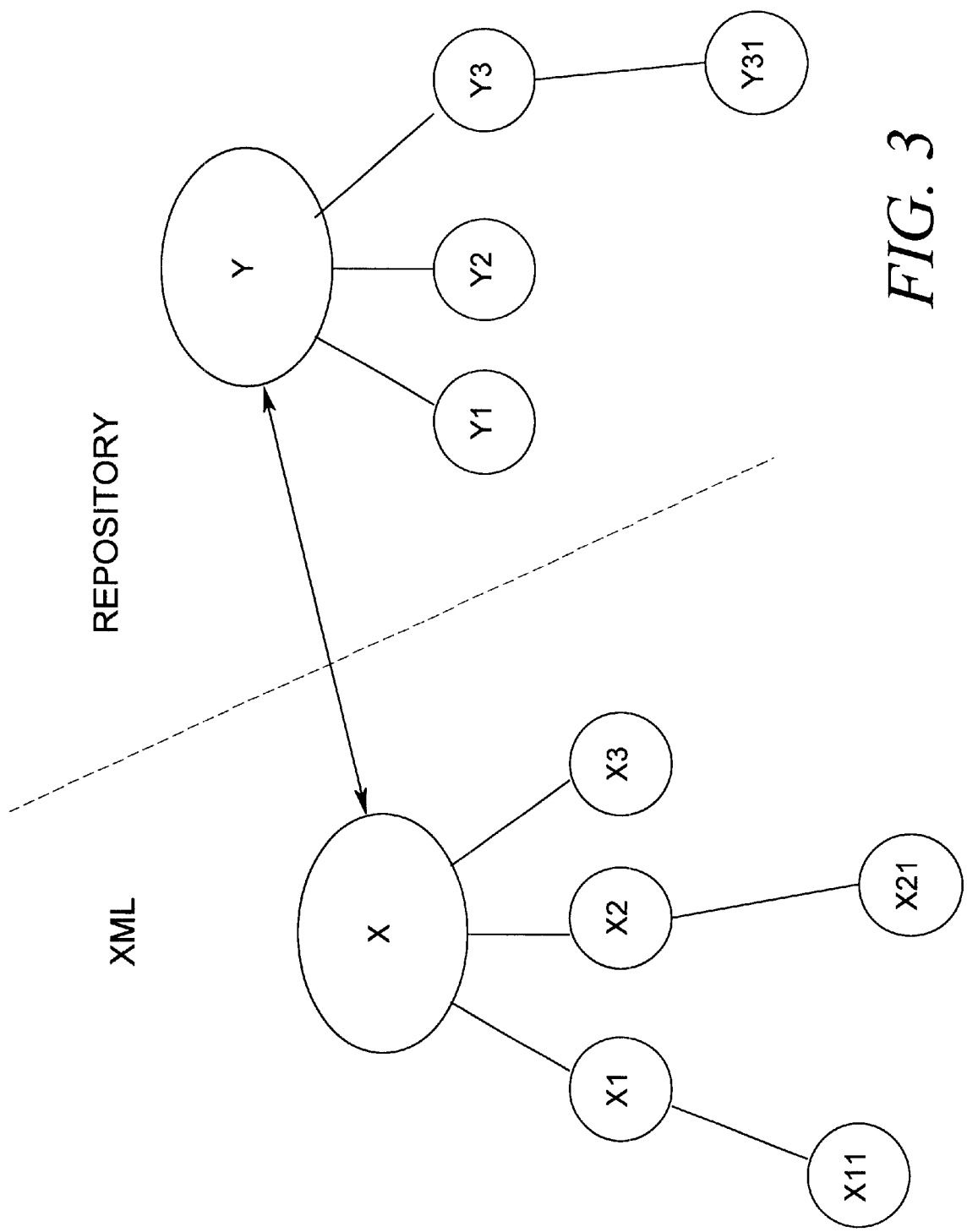
FIGS. 3 is an object diagram illustrating the concept of object containment.

Referring now to FIG. 3, an object diagram illustrating the concept of object containment is shown. Within XML, a parent object X has three illustrated owned objects X1, X2 and X3, wherein owned object X1 owns object X11 and object X2 owns object X21. After the XML file is parsed the objects (X, X1, X2, X3, X11 and X21) are represented as a DOM ("Doument Object Model") object tree, as shown in FIG. 3. The term "level" as used herein refers to all those objects at the same ownership from an owning object. For example, objects X1, X2 and X3 are all on the same level; and, the owned objects X11 and X21 are on the same level. The term "depth" refers within a single branch from the root object (e.g., object X or Y) to each owned object. For example, traversing from X, to X1 to X11 is a depth-first traversal of the objects.

On the repository side of the diagram, the same concepts apply to the object Y, owned objects Y1, Y2 and Y3, as well as the owned object Y31.

Figure 4A:
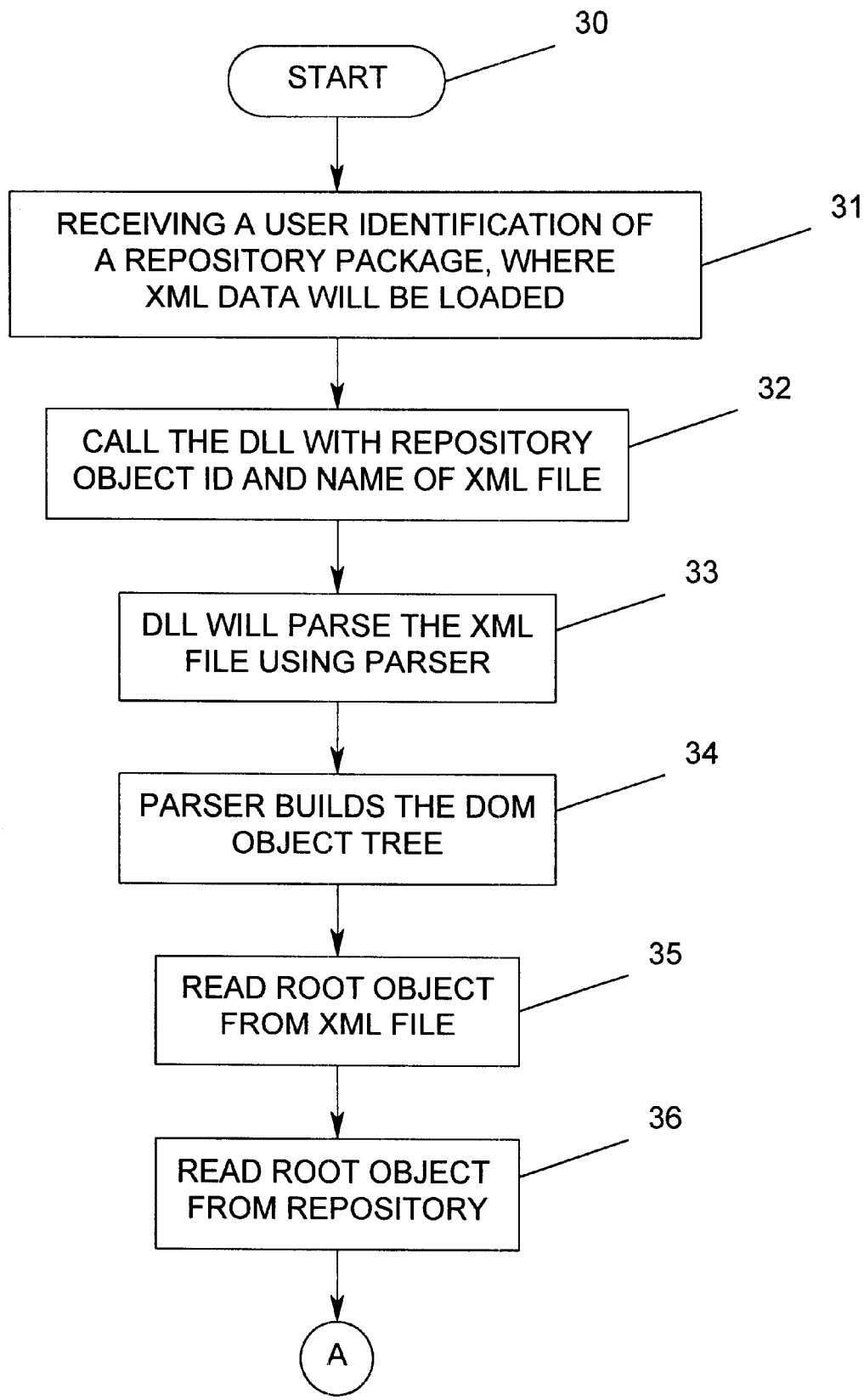

Referring now to FIG. 4A, the first of a three-sheet flow chart of the overall process is shown. The process begins with a start bubble 30 followed by a step of receiving a user's identification of a repository package from where XML data will be loaded (block 31). Next, the dll program 20 is called with the repository object ID and name of the XML file (block 32). After this, the dll program 20 will parse the XML file using the parser 23 (block 33). The parser then builds the DOM object tree (block 34). Following this, the root object is read from the XML file (block 35) and the root object is read from the repository (block 36). The process illustration continues in FIG. 4B as denoted by a connector A.

Referring now to FIG. 4B at the connector A, an inquiry is made as to whether or not the XML object has a name (diamond 37). If the answer to this inquiry is yes, then another inquiry is made as to whether or not the repository object has a name (diamond 38). If the answer to this second inquiry is yes, then a third inquiry is made as to whether or not the XML object name and the repository object name match (diamond 39). If the answer to this inquiry is yes, then the object is found (block 40). On the other hand, if the names do not match or if the repository object does not have a name, the repository object name is changed to the XML object name (block 41).

If the XML object does not have a name, no leg from the diamond 37, then still another inquiry is made as to whether or not the repository object has a name (diamond 42). If the answer to this inquiry is yes, then the repository object name is removed (block 43). On the other hand, if the repository object does not have a name; or upon completion of the steps depicted by the blocks 40 or 41, the process illustration continues in FIG. 4C as denoted by a connector B.

Figure 4C:
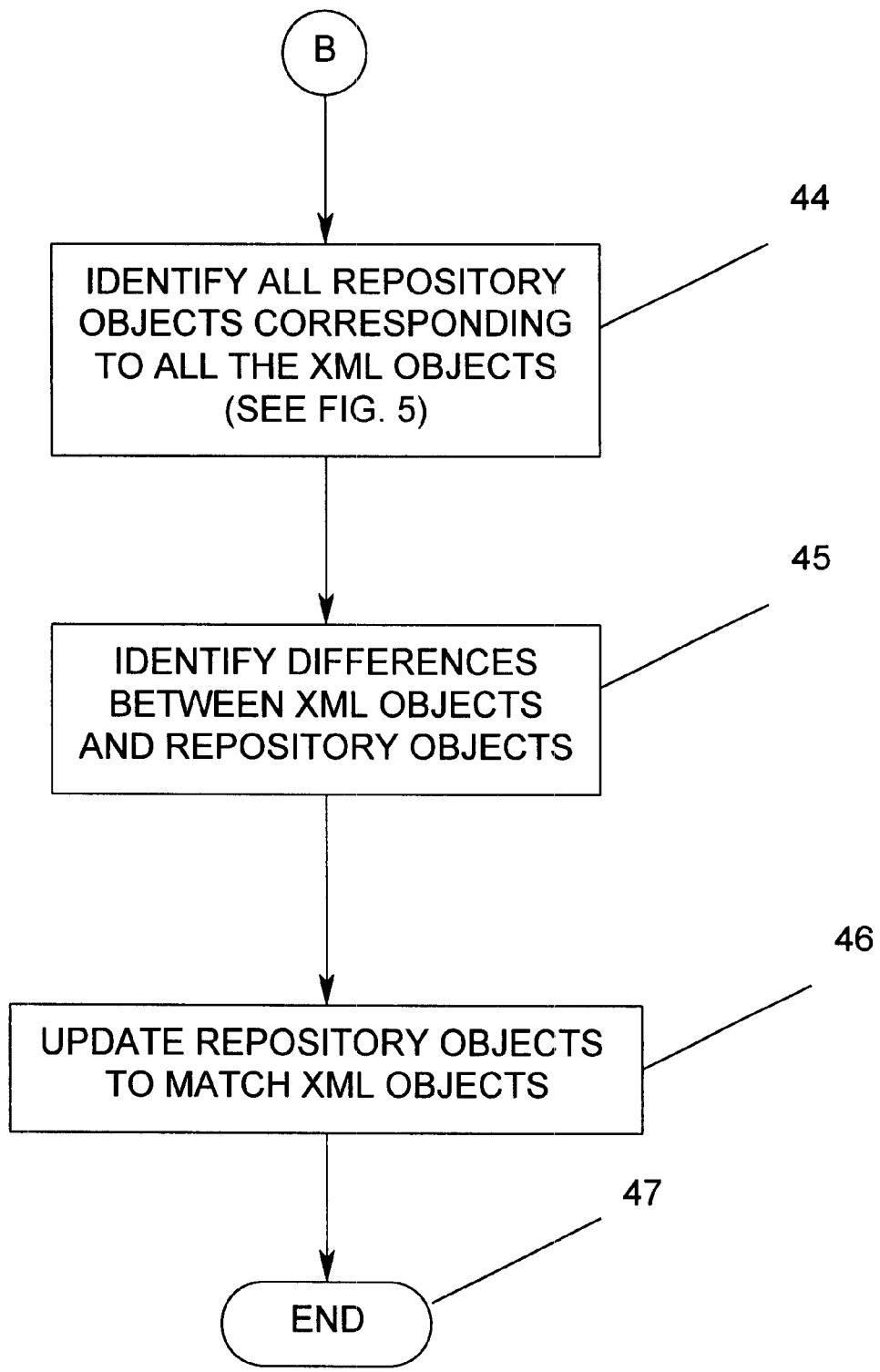

Referring now to FIG. 4C at the connector B, all repository objects corresponding to all the XML objects are identified (block 44). The details of this step are amplified in FIG. 5 and described further hereinbelow. Next, the differences between the XML objects and the repository objects are identified (block 45); and, the repository objects are updated to match the XML objects block 46 and the process ends (bubble 47). The details of the parts of the process depicted by the blocks 45 and 46 are described in further detail in the U.S. Pat. No. 6,330,569, issued on Dec. 11, 2001.

Figure 5:
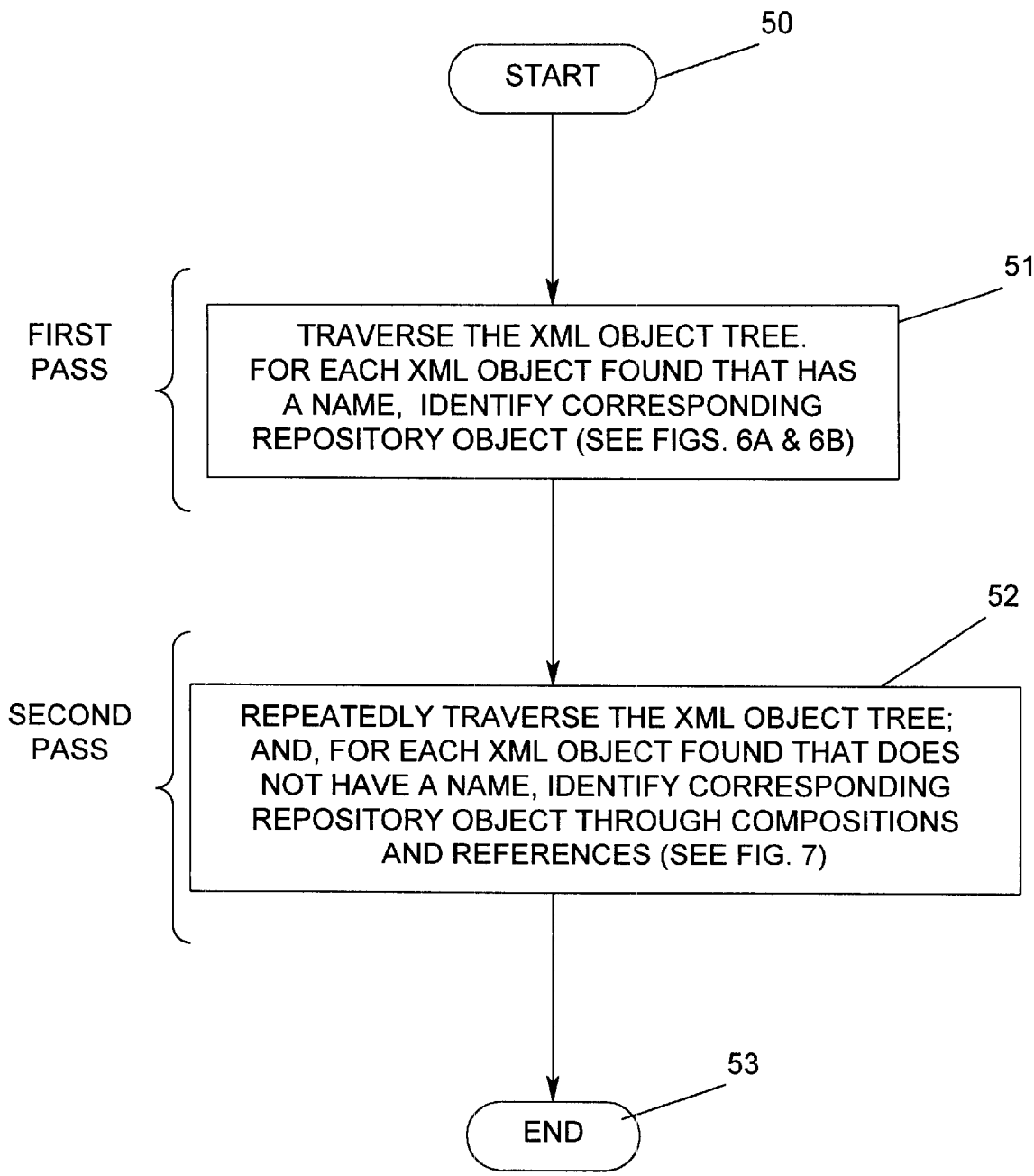
FIG. 5 is a flow chart of the overall process for identifying all repository objects corresponding to all XML objects.

Referring now to FIG. 5, the process for identifying all the repository objects corresponding to all the XML objects is shown. The process begins with a start bubble 50 followed by a step of traversing the XML object tree; and, for each XML object found that has a name identifying the corresponding repository object (block 51). This part of the process is amplified in FIGS. 6A and 6B and will be described further hereinafter. Next, the XML object tree is again traversed; however, in this part of the process it is traversed repeatedly for each of the steps depicted in FIG. 7. For each XML object found during a traversal that does not have a name, the corresponding repository object is identified through Compositions and References (block 52). This part of the process is amplified in FIG. 7 and will be described further hereinafter. After this, the process ends (bubble 53).

Figure 6A:
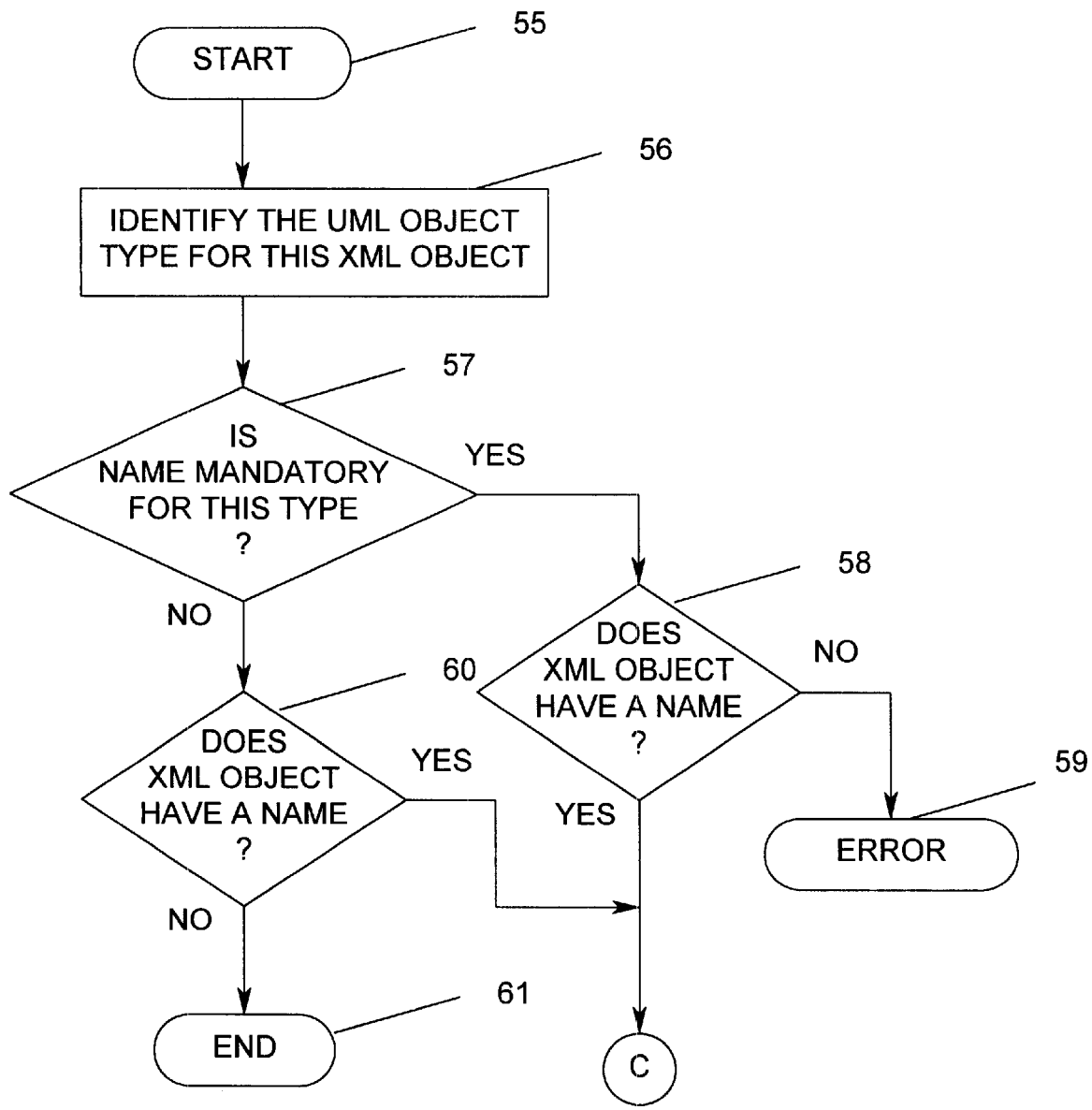
FIGS. 6A and 6B combined form a flow chart of the process for identifying the corresponding repository object for each XML object with a name.

Referring now to FIG. 6A, the first of a two-sheet illustration is shown of the process for identifying repository objects that correspond to each XML object found that has a name. The process begins with a start bubble 55 followed by a step of identifying the UML object type for this object XML object; i.e., the current XML object under analysis (block 56). After this, an inquiry is made as to whether or not a name is mandatory for this type (diamond 57). If the answer to this inquiry is yes, then another inquiry is made as to whether or not the XML object has a name (diamond 58). If the answer to this latter inquiry is no, then an error message is recorded (bubble 59). On the other hand if a name is not mandatory for this type, then still another inquiry is made as to whether or not the XML object has a name (diamond 60). If the answer to this inquiry is no, then the process ends (bubble 61). On the other hand, if the XML object does have a name, then the process illustration continues in FIG. 6B as depicted by a connector C.

Figure 6B:
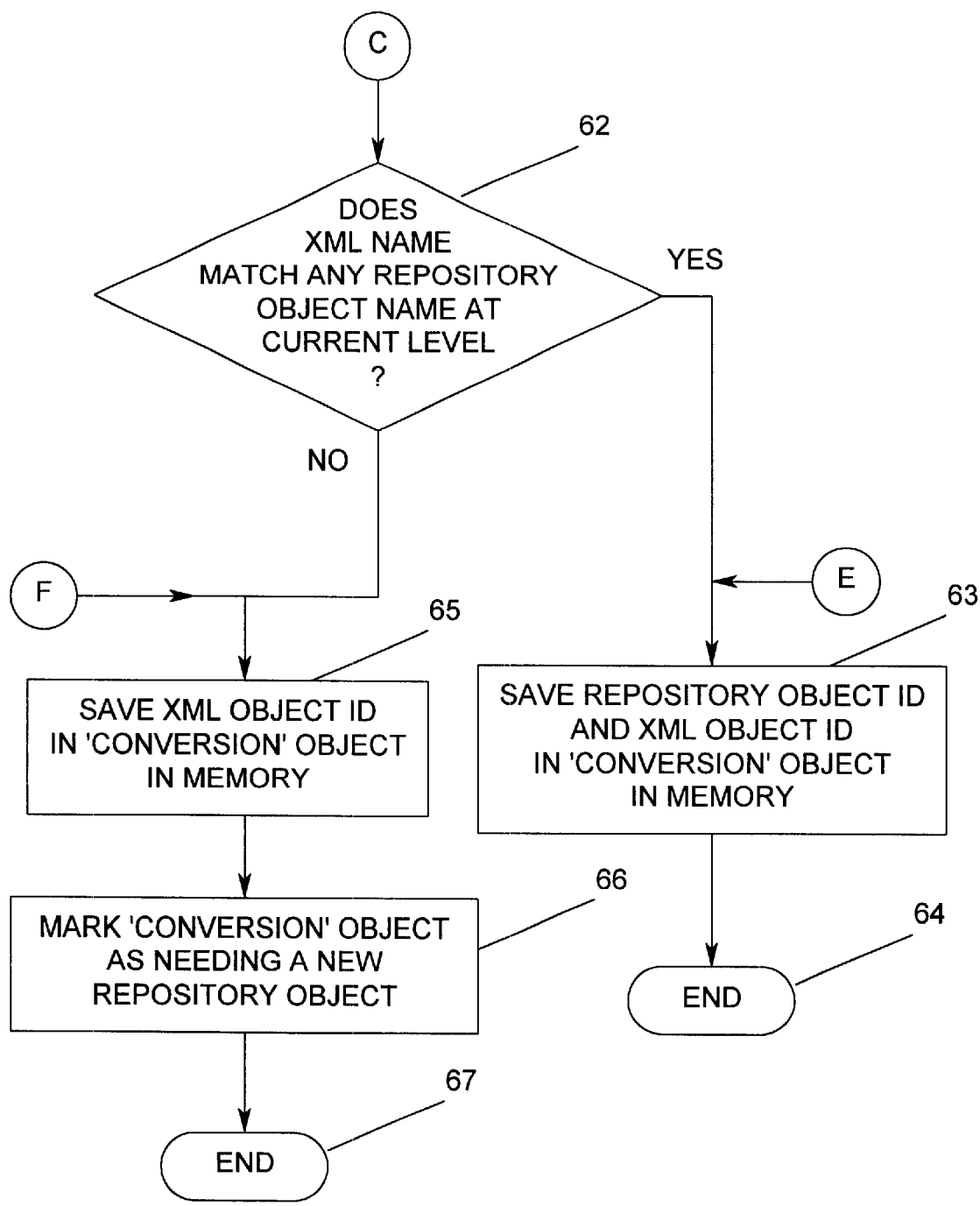

Referring now to FIG. 6B at the connector C, an inquiry is made as to whether or not the XML name matches any repository object name at the current level (diamond 62). If the answer to this inquiry is yes, then the repository object ID and the XML object are saved in memory in an object named 'Conversion' (block 63). After this the process ends (bubble 64). Returning back to the diamond 62, if the XML name does not match any repository object name at the current level, then the XML object ID is saved in the 'Conversion' object in memory (block 65). Next, the 'Conversion' object is marked as needing a new repository object (block 66). This means that a new repository object is to be created. After this, the process ends (bubble 67).

Figure 7:
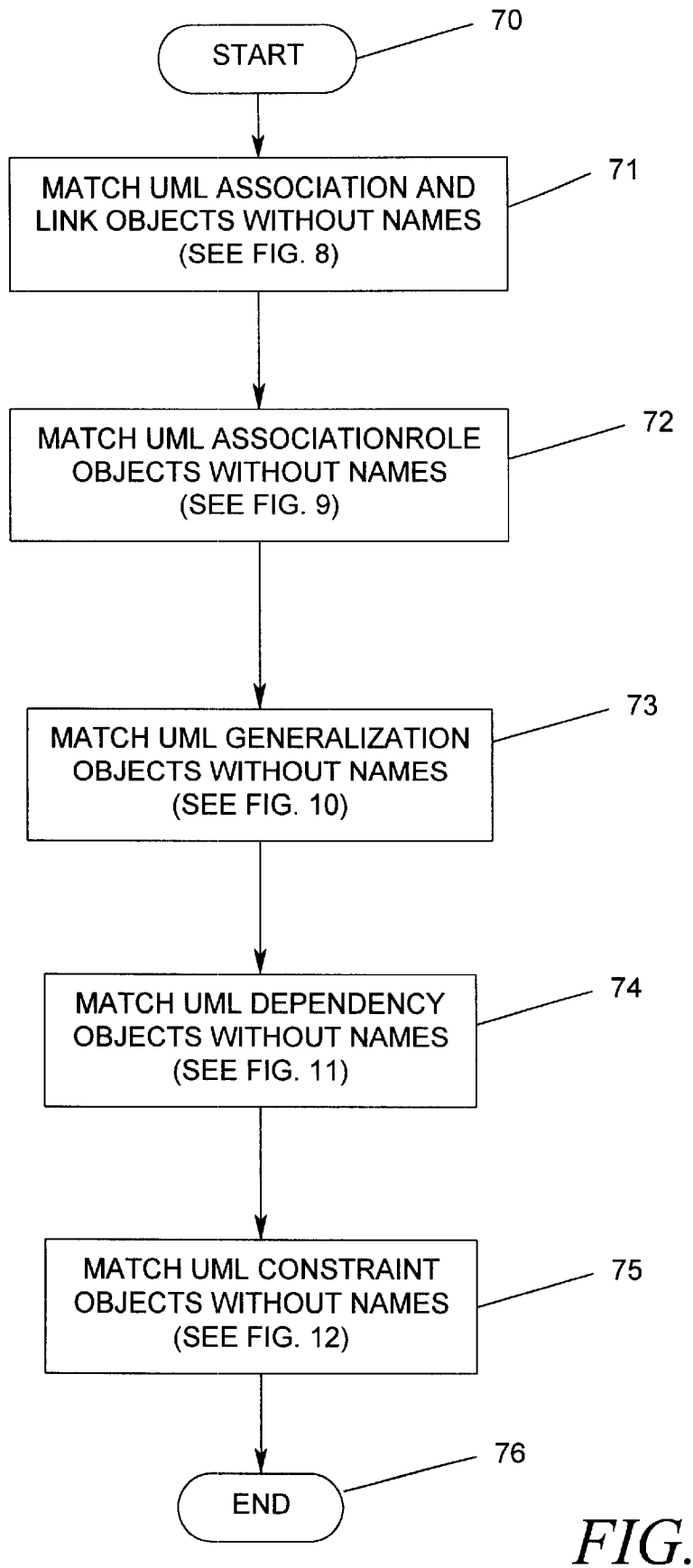
FIG. 7 is a flow chart of the process for identifying the corresponding repository object for each XML object without a name.

Referring now to FIG. 7, the process for identifying the corresponding repository object for each XML object without a name is shown. The process begins with a start bubble 70 followed by a step of matching UML Association and Link objects without names (block 71). The details of the step of the process are amplified in FIG. 8 and described further hereinafter. Next, the UML AssociationRole objects without names are matched (block 72). The details of the step of the process are amplified in FIG. 9 and described further hereinafter. After this, the UML Generalization objects without names are matched (block 73). The details of the step of the process are amplified in FIG. 10 and described further hereinafter.

Following the above, the UML Dependency objects without names are matched (block 74). The details of the step of the process are amplified in FIG. 11 and described further hereinafter. The UML Constraint objects without names are thereafter matched (block 75). The details of the step of the process are amplified in FIG. 12 and described further hereinafter. The process then ends (bubble 76).

Figure 8:
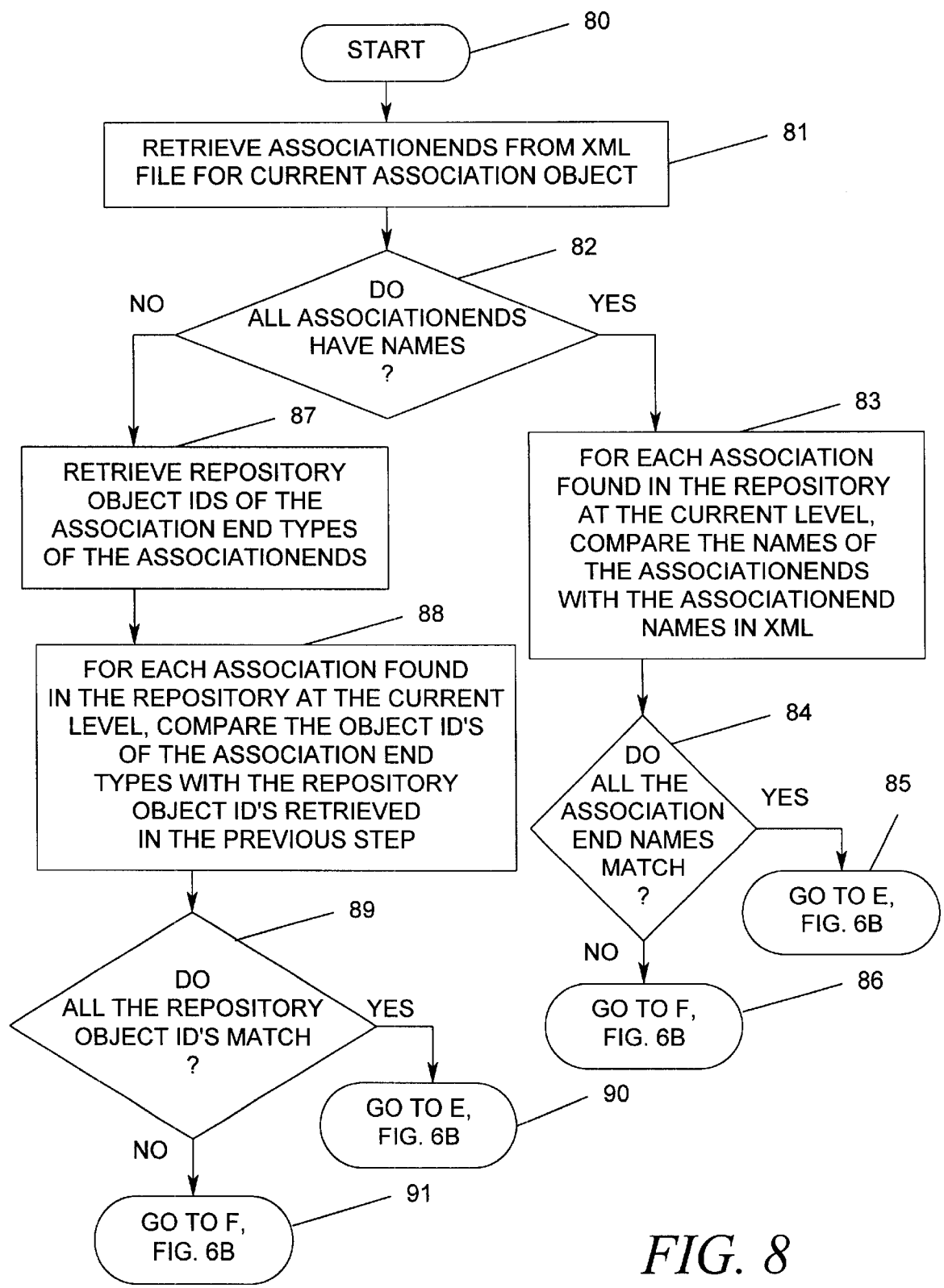
FIG. 8 is a flow chart illustrating the process for matching UML Associations and links without names.

Referring now to FIG. 8, the process for matching Associations and Links without names is shown. The process begins with a start bubble 80, followed by a step of retrieving AssociationEnds from the XML file for the current Association object (block 81). Next, an inquiry is made as to whether or not all AssociationEnds have names (diamond 82). If the answer to this inquiry is yes, then for each Association found in the repository at the current level, the names of the AssociationEnds are compared with the AssociationEnd names in the XML file (block 83). After this, another inquiry is made as to whether or not all the AssociationEnd names match (diamond 84). If the answer to this inquiry is yes, then a branch is made back to a connector E of FIG. 6B for saving the repository object and the XML object ID's in the 'Conversion' object in memory (bubble 85). On the other hand, if the answer to this inquiry is no, then a branch is made back to a connector F in FIG. 6B for saving the XML object ID in the 'Conversion' object in memory.

Returning back to the decision diamond 82, if all of the AssociationEnds do not have names, then the repository object ID of the AssociationEnd types of the AssociationEnds is retrieved from the 'Conversion' object (block 87). Next, for each Association found in the repository at the current level, compare the object ID's of the AssociationEnd types with the repository object ID's retrieved in the previous step (block 88). Following this, another inquiry is made as to whether or not all the repository object ID's match (diamond 89). If the answer to this inquiry is yes, then a branch is made back to FIG. 6B at the connector E (bubble 90). On the other hand, if all of the repository object ID's do not match, then a branch is made back to the connector F in FIG. 6B.

Figure 9:
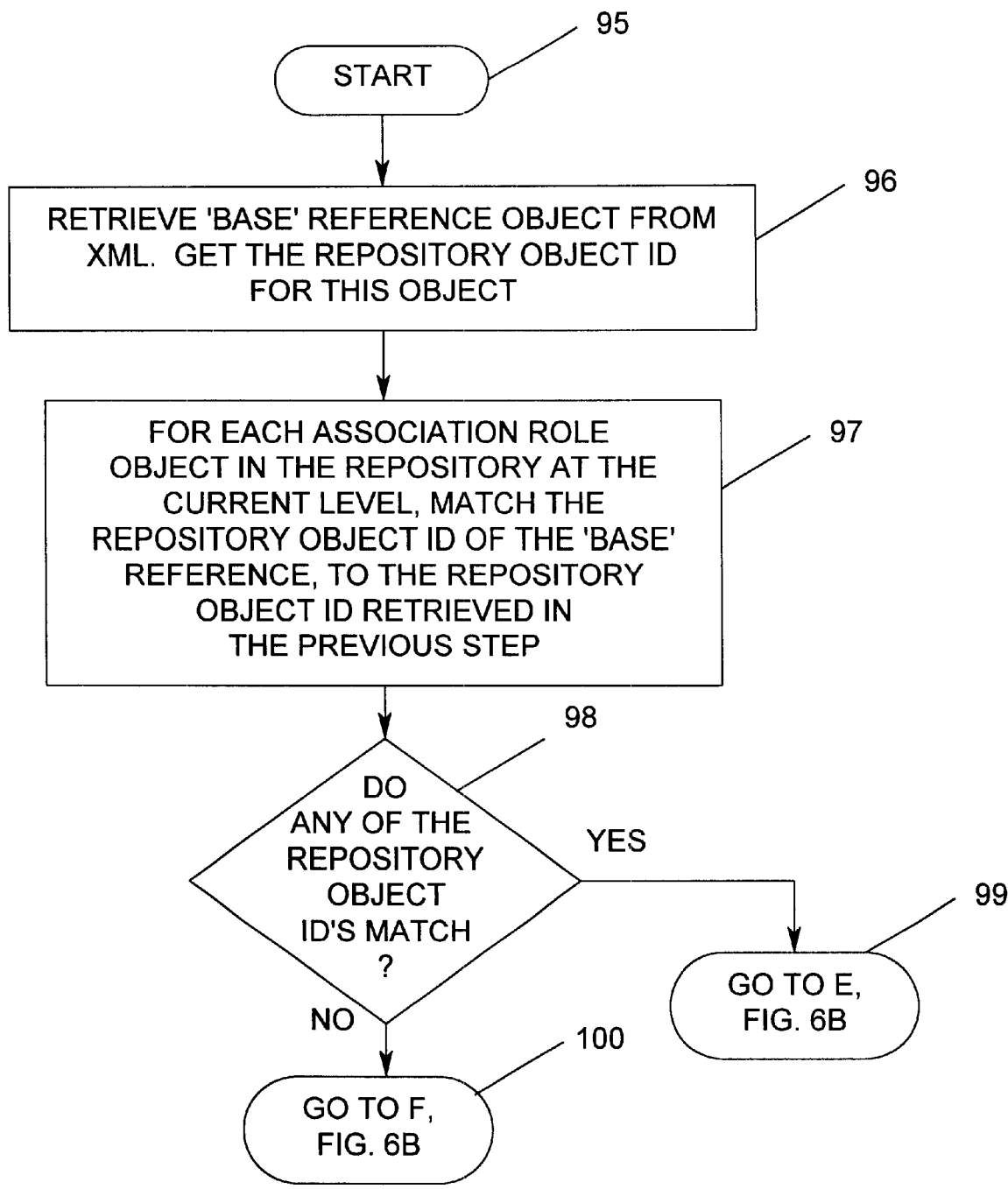
FIG. 9 is a flow chart illustrating the process for matching UML AssociationRole objects without names.

Referring now to FIG. 9, the process for matching UML AssociationRole objects without names is shown. The process begins with a start bubble 95 followed by a step of retrieving 'Base' Reference object from the XML file; and, the repository object ID for this object is obtained (block 96). Next, for each AssociationRole object in the repository at the current level, the repository object ID of the 'Base' Reference is matched to the repository object ID retrieved in the previous step (block 97). Following this, an inquiry is made as to whether or not any of the repository object ID's match (diamond 98). If the answer to this inquiry is yes, then a branch is made to the connector E in FIG. 6B. On the other hand, if the answer to this inquiry is no, then a branch is made to the connector F in FIG. 6B.

Figure 10:
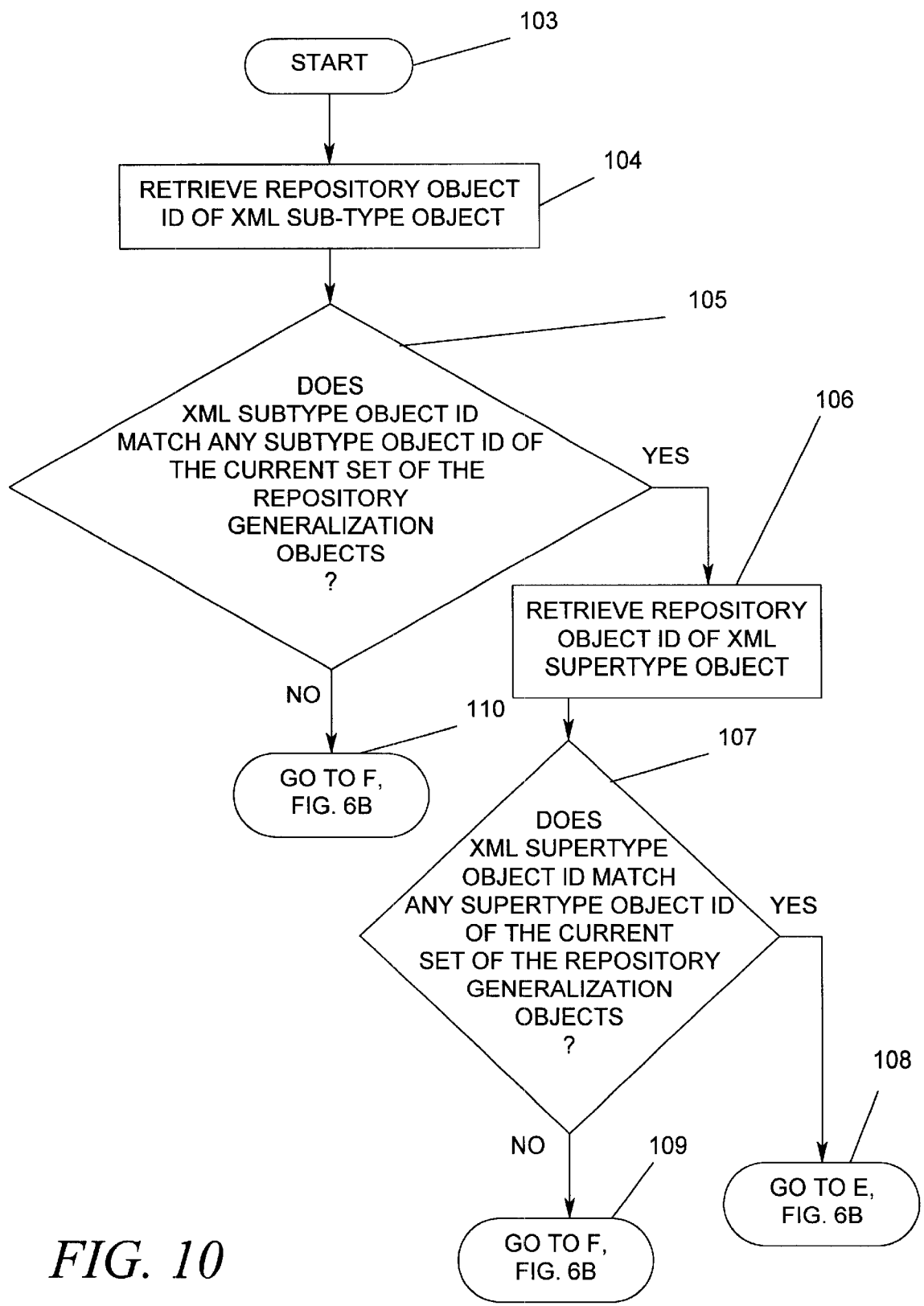
FIG. 10 is a flow chart of the process for matching UML Generalization objects without names.

Referring now to FIG. 10, the process for matching UML Generalization objects without names is shown. The process begins with a start bubble 103 followed by a step of retrieving the repository object ID of the XML sub-type object (block 104). Next, an inquiry is made as to whether or not the XML sub-type object ID matches any sub-type object ID of the current set of repository generalization objects (diamond 105). If the answer to this inquiry is yes, then the repository object ID of the XML super-type object is retrieved (block 106). Next, another inquiry is made as to whether or not the XML super-type object ID matches any sub-type object ID of the current set of repository generalization objects (diamond 107). If the answer to this inquiry is yes, then a branch is made to the connector E in FIG. 6B. On the other hand, if the answer to this inquiry is no, or if the answer to the inquiry depicted by the diamond 105 is no, then a branch made to the connector F in FIG. 6B (bubbles 109 and 110).

Figure 11:
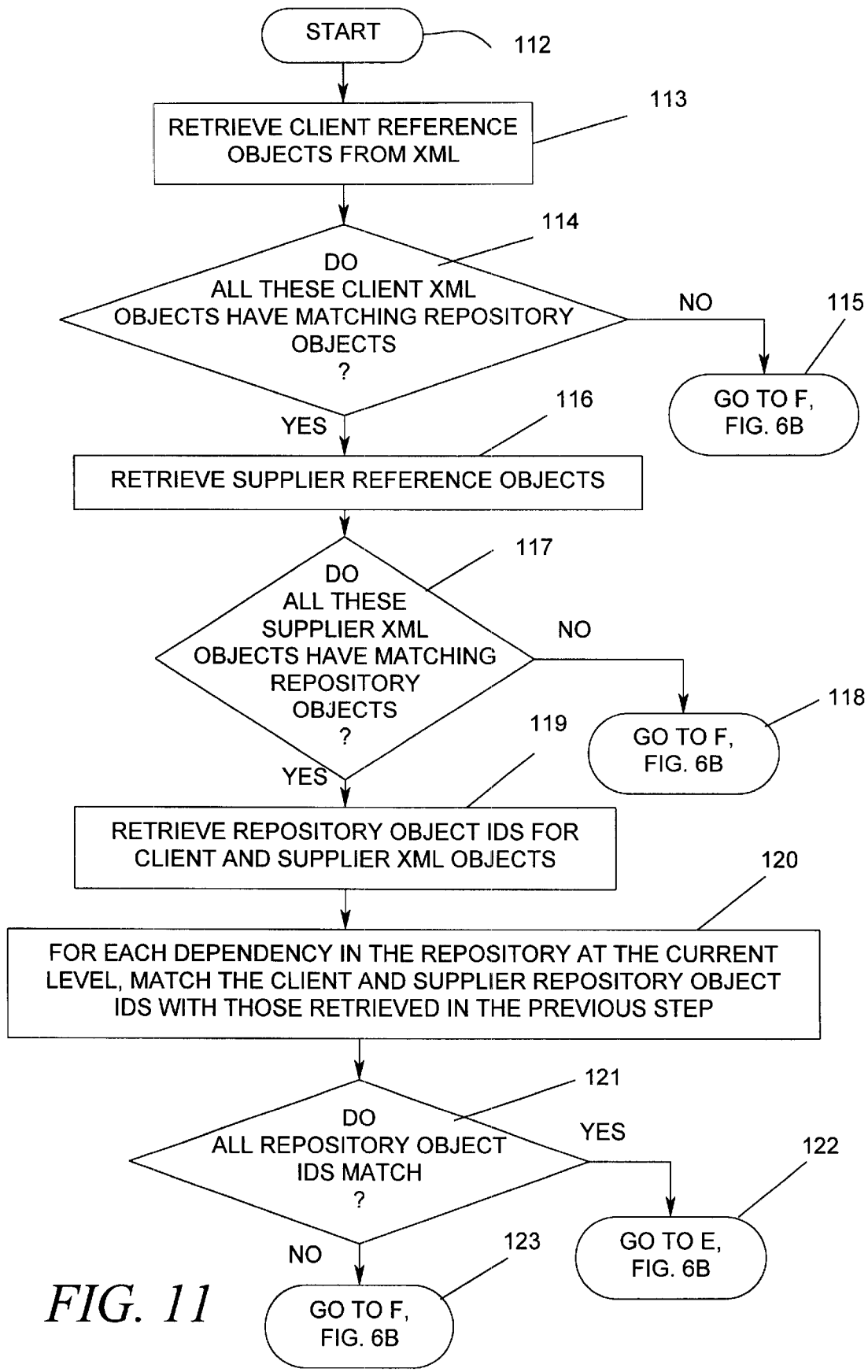
FIG. 11 is a flow chart of the process for matching UML Dependencies without names.

Referring now to FIG. 11, the process for matching UML Dependencies without names is shown. The process begins with a start bubble 112 followed by a step of retrieving client Reference objects from the XML file (block 113). Next, an inquiry is made as to whether or not all the client XML objects have matching repository objects (diamond 114). If the answer to this inquiry is no, then a branch is made to the connector F in FIG. 6B. (bubble 115). On the other hand, if the answer to this inquiry is yes, then the supplier Reference objects are retrieved from the XML file (block 116). After this, another inquiry is made as to whether or not all these supplier XML objects have matching repository objects (diamond 117). If the answer to this inquiry is no, then a branch is made to the connector F in FIG. 6B.

On the other hand, if the answer to the inquiry depicted by the diamond 117 is yes, then the repository object ID's for the client and supplier XML objects are retrieved from the 'Conversion' object (block 119). Next, for each Dependency in the repository at the current level, the client and supplier repository object ID's are matched with those retrieved in the previous step (block 120). Following the above, still another inquiry is made as to whether or not all repository object ID's match (diamond 121). If the answer to this inquiry is yes, then a branch is made to the connector E in FIG. 6B (bubble 122). On the other hand, if the answer to this latter inquiry is no, then a branch is made to the connector F in FIG. 6B (bubble 123).

Figure 12:
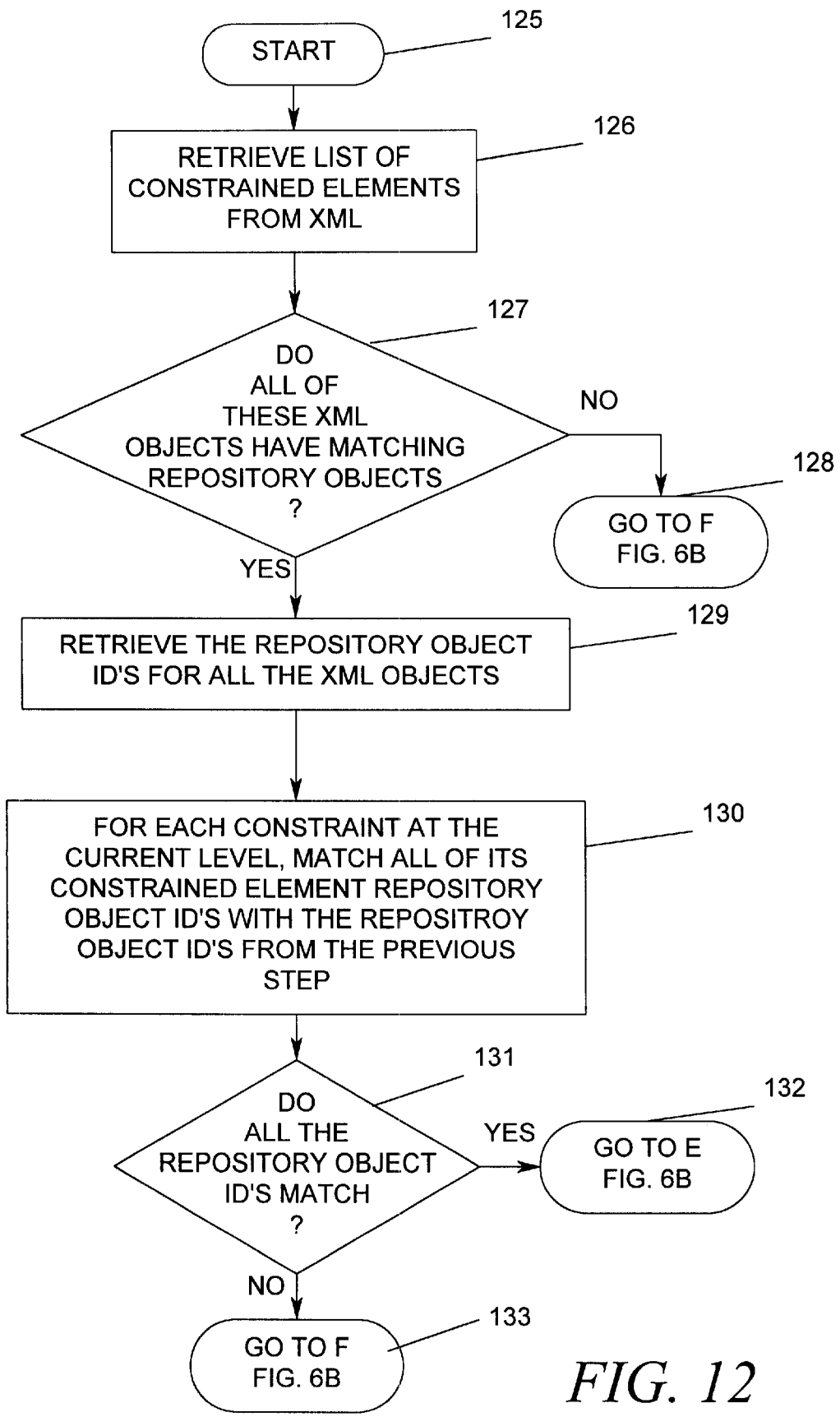
FIG. 12 is a flow chart of the process for matching UML Constraints without names.

Referring now to FIG. 12, the process for matching UML Constraints without names is shown. The process begins with a start bubble 125 followed by a step of retrieving a list of ConstrainedElements from the XML file (block 126). Next, an inquiry is made as to whether or not all of these XML objects have matching repository objects (diamond 127). If the answer to this inquiry is no, then a branch is made to the connector F in FIG. 6B (bubble 128). On the other hand, if the answer to this inquiry is yes, then the repository object ID's for all of the XML objects is retrieved from the 'Conversion' object (block 129). After this, for each Constraint at the current level, a match is made of all of its ConstrainedElement repository object ID's with the repository object ID's form the previous step (block 130). Another inquiry is then made as to whether or not all of the repository object ID's match (diamond 131). If the answer to this inquiry is yes, then a branch is made to the connector E in FIG. 6B (bubble 132). On the other hand, if the answer to this inquiry is no, then a branch is made to the connector F in the FIG. 6B (bubble 133).

Figure 13:
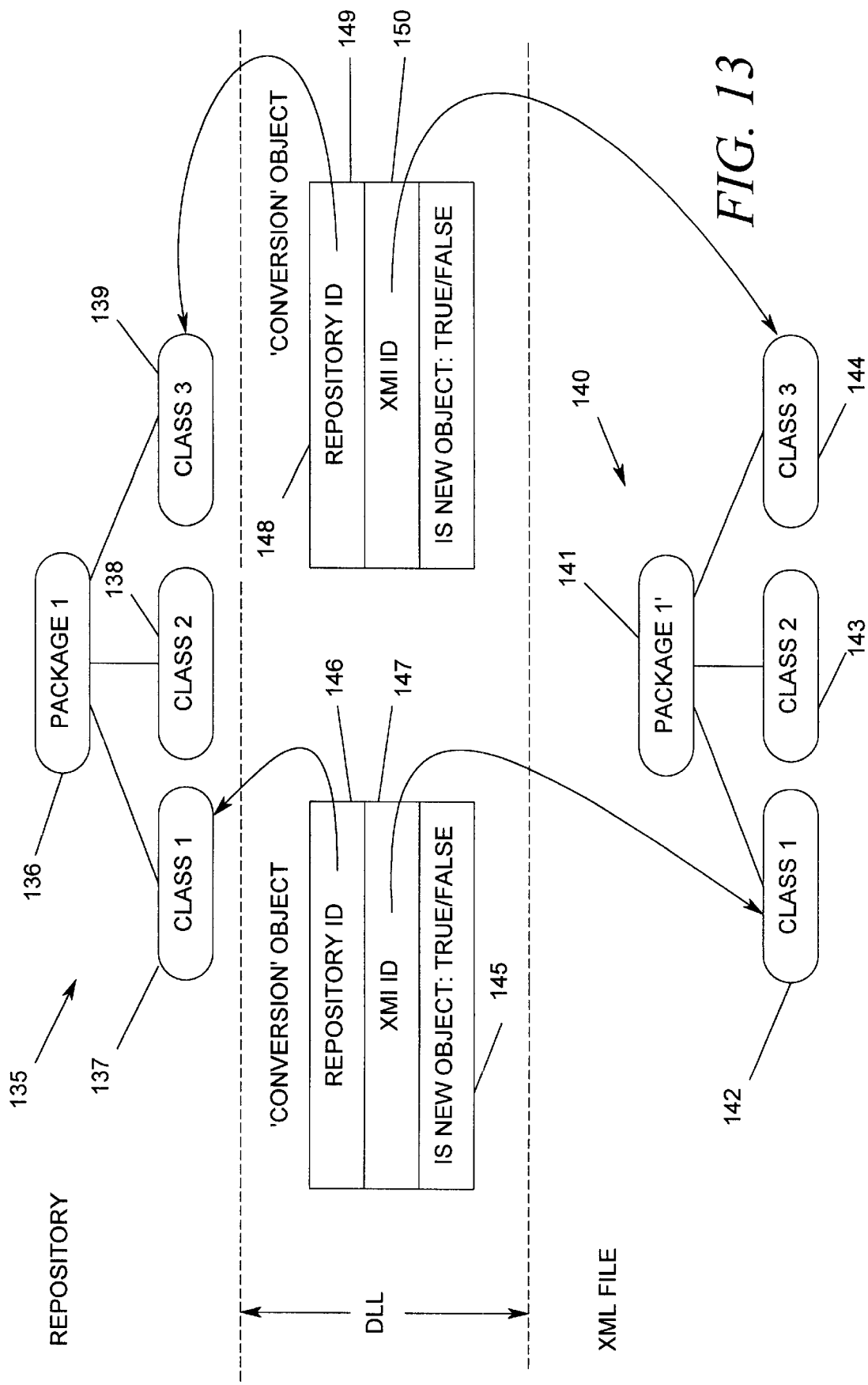
FIG. 13 is a schematic diagram illustrating a partial storage map in memory of 'Conversion' objects that identify and link the XML and repository objects.

Referring now to FIG. 13, a schematic diagram illustrating a partial storage map in memory of 'Conversion' objects that identify and link the XML and repository objects is shown. A repository model 135 is made up of a package 136, which may typically comprise classes 137, 138 and 139. In a similar manner, an XML model 140 is made up of a package 141, which may typically comprise classes 142, 143 and 144. Following completion of the process described hereinabove, 'Conversion' object 145 includes the repository ID for the class 137 and the XMI ID for the class 142. Similarly, a 'Conversion' object 148 includes a repository ID 149 for the class 139 and an XMI ID for the class 144. Every object in the XML file will have a corresponding 'Conversion' object and those 'Conversion' objects will either have a repository ID that identifies the corresponding repository object, or in the case where there is no corresponding object—NEW OBJECT will be set to TRUE.

The methods and apparatus of the present invention, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Although the invention has been described with reference to a specific embodiment, this description is not meant to be construed in a limiting sense. Various modifications of the disclosed embodiment as well as alternative embodiments of the invention will become apparent to one skilled in the art upon reference to the description of the invention. It is therefore contemplated that the appended claims will cover any such modifications of embodiments that fall within the true scope of the invention.

What is claimed is:

1. In a computer system executing a repository program and having a memory, a method for identifying UML (Unified Modeling Language) objects in said repository with objects in an XML (Extensible Markup Language) file, said method comprising the steps of:
    a. parsing said XML file into XML objects and building an object tree;
    b. traversing said object tree a first time, and for each XML object found that has a name, identifying corresponding UML objects;
    c. traversing said object tree a second time, and for each XML object found that does not have a name, identifying corresponding UML objects through compositions and references; and
    d. saving 'Conversion' objects in said memory indicative of the results of said parsing and traversing.

2. The method as in claim 1, wherein said step of parsing further includes:
    e. reading root XML object from said object tree;
    f. reading root UML object from said repository.

3. The method as in claim 2, further including the steps of:
    g. determining if said root XML object has a name, and if so;
    h. determining if traversal of said object tree is complete, and if not;
    i. repeating all of the steps above until said traversal is complete.

4. The method as in claim 3, wherein said root XML object does not have a name and said root UML object does have a name, further including the step of removing the name from said UML object.

5. The method as in claim 3, wherein said XML root object has a name and said UML object does not have a name, further including the step of changing said UML object name to the same as said XML root object name.

6. The method as in claim 3, wherein said XML root object has a name and said UML object also has a name, further including the step of determining if said UL object name is the same as said XML root object name.

7. The method as in claim 6, wherein said XML root object name is not the same as said UML object, further including the step of changing said UML object name to the same as said XML root object name.

8. The method as in claim 1, wherein said step of traversing said object tree a first time includes the steps of:
    a. identifying said UML object type for each XML object;
    b. when said XML object name matches said UML object name at current level, saving an object ID for said UML object and an object ID for said XML object in a 'Conversion' object in said memory.

9. The method as in claim 8, wherein if said XML object name does not match said UML object at current level, saving said XML object ID in a 'Conversion' object in said memory and marking the 'Conversion' object as needing a new UML object.

10. The method as in claim 1, wherein said root XML object does not have a name and said root UML object does not have a name, further including the step of matching said UML Association and Link objects without names by matching the names and types of their connections.

11. The method as in claim 1, wherein said step of traversing said object tree a second time further includes the step of matching UML Association Role objects without names by matching the base Association for the Association Role.

12. The method as in claim 1, wherein said step of traversing said object tree a second time further comprises the step of matching UML Generalization objects without names by matching the sub-type and super-type of each UML Generalization object.

13. The method as in claim 1, wherein said step of traversing said object tree a second time further includes the step of matching UML Dependency objects without names by matching the client and supplier of each UML Dependency object.

14. The method as in claim 1, wherein said step of traversing said object tree a second time further includes the step of matching UML Constraint objects without names by matching the Constrained Elements of each UML Constraint object.

15. A storage medium encoded with machine-readable computer program code for identifying UML object in a repository with objects in an XML file, wherein, when the computer program code is executed by a computer, the computer performs the steps of:
   a. parsing said XML file into XML objects and building an object tree;
   b. traversing said object tree a first time, and for each XML object found that has a name, identifying corresponding UML objects; and,
   c. traversing said object tree a second time, and for each XML object found that does not have a name, identifying corresponding UML objects through compositions and references; and
   d. saving 'Conversion' objects in said memory indicative of the results of said parsing and traversing.

16. The storage medium as in claim 15, wherein said step of parsing further includes:
   e. reading root XML object from said object tree;
   f. reading root UML object from said repository.

17. The storage medium as in claim 16, further including the steps of:
   g. determining if said root XML object has a name, and if so;
   h. determining if traversal of said object tree is complete, and if not;
   i. repeating all of the steps above until said traversal is complete.

18. The storage medium as in claim 17, wherein said root XML object does not have a name and said root UML object does have a name, further including the step of removing the name from said UML object.

19. The storage medium as in claim 17, wherein said XL root object has a name and said UML object does not have a name, further including the step of changing said UML object name to the same as said XML root object name.

20. The storage medium as in claim 17, wherein said XML root object has a name and said UML object also has a name, further including the step of determining if said UML object name is the same as said XML root object name.

21. The storage medium as in claim 20, wherein said XML root object name is not the same as said UML object, further including the step of changing said UML object name to the same as said XML root object name.

22. The storage medium as in claim 15, wherein said step of traversing said object tree a first time further includes the steps of:
   a. identifying said UML object type for each XML object;
   b. when said XML object name matches said UML object name at current level, saving an object ID for said UML object and an object ID for said XML object in a 'Conversion' object in said memory.

23. The storage medium as in claim 22, wherein said XML object name does not match said UL object at current level, saving said XML object ID in a 'Conversion' object in said memory and marking the 'Conversion' object as needing a new UML object.

24. The storage medium as in claim 15, wherein said root XML object does not have a name and said root UML object does not have a name, further including the step of matching said UML Association and Link objects without names.

25. The storage medium as in claim 15, wherein said step of traversing said object tree a second time further includes the step of matching UML Association Role objects without names by matching the base Association for the Association Role.

26. The storage medium as in claim 15, wherein said step traversing said object tree a second time further comprises the step of matching UML Generalization objects without names by matching the sub-type and super-type of each UML Generalization.

27. The storage medium as in claim 15, wherein said step of traversing said object tree a second tie further includes the step of matching UML Dependency objects without names by matching the client an supplier of each UML Dependency object.

28. The storage medium as in claim 15, wherein said step of traversing said object tree a second time further includes the step of matching UML Constraint objects without names by matching the Constrained Elements of each UML Constraint object.

* * * * *